(12) United States Patent
Niemasz et al.

(10) Patent No.: US 10,243,907 B2
(45) Date of Patent: Mar. 26, 2019

(54) SYSTEM AND METHOD FOR COMMUNICATION AMONGST ENTITIES BY WAY OF PUBLIC IDENTIFIERS

(71) Applicants: John Niemasz, Newton, NJ (US); Walid Nabhane, Long Valley, NJ (US)

(72) Inventors: John Niemasz, Newton, NJ (US); Walid Nabhane, Long Valley, NJ (US)

( * ) Notice: Subject to any disclaimer, the term of this patent is extended or adjusted under 35 U.S.C. 154(b) by 368 days.

(21) Appl. No.: 15/059,088

(22) Filed: Mar. 2, 2016

(65) Prior Publication Data

US 2016/0261555 A1    Sep. 8, 2016

Related U.S. Application Data

(60) Provisional application No. 62/128,333, filed on Mar. 4, 2015.

(51) Int. Cl.
| | |
|---|---|
| *G06F 15/16* | (2006.01) |
| *H04L 12/58* | (2006.01) |
| *H04L 29/12* | (2006.01) |
| *H04L 29/08* | (2006.01) |

(52) U.S. Cl.
CPC ............. *H04L 51/28* (2013.01); *H04L 61/10* (2013.01); *H04L 61/15* (2013.01); *H04L 61/2596* (2013.01); *H04L 61/301* (2013.01); *H04L 67/00* (2013.01)

(58) Field of Classification Search
CPC ....... H04L 61/15–61/157; H04L 61/25–61/30; H04L 51/28; H04L 61/301–61/35
See application file for complete search history.

(56) References Cited

U.S. PATENT DOCUMENTS

| | | | | |
|---|---|---|---|---|
| 5,822,526 A | * | 10/1998 | Waskiewicz | .......... H04L 61/307 |
| | | | | 709/206 |
| 7,016,938 B1 | * | 3/2006 | Quine | ................. H04L 29/1215 |
| | | | | 709/204 |
| 2003/0055978 A1 | * | 3/2003 | Collins | ................... H04L 29/06 |
| | | | | 709/227 |
| 2004/0122905 A1 | * | 6/2004 | Smith | .................. G06Q 10/107 |
| | | | | 709/206 |
| 2006/0136561 A1 | * | 6/2006 | Lee | ..................... H04L 29/1215 |
| | | | | 709/206 |

(Continued)

*Primary Examiner* — Brendan Y Higa
(74) *Attorney, Agent, or Firm* — Duane Morris LLP

(57) ABSTRACT

Systems and methods disclosed herein facilitate communication in a communication network amongst entities by way of publicly-available identifiers. In an embodiment a first entity sends to a node in the communication network a first electronic communication which includes a public or private identifier for the first entity and a public identifier for a second entity which is a publicly-available identifier observable by the first entity and may include, for example, a vehicle identifier, a geographic locator, a venue identifier, a seating locator, a wearable identification device, and combinations thereof. The node determines a private identifier for the second entity based on the received public identifier for the second entity and sends a second electronic communication to the second entity which includes at least one of the public or private identifier for the first entity and at least one of the public or private identifier for the second entity.

26 Claims, 4 Drawing Sheets

(56) References Cited

U.S. PATENT DOCUMENTS

2011/0238767 A1* 9/2011 Murphy .................. H04L 51/12
709/206
2013/0339464 A1* 12/2013 Goudarzi ............ H04L 61/1547
709/206

* cited by examiner

SYSTEM AND METHOD FOR COMMUNICATION AMONGST ENTITIES BY WAY OF PUBLIC IDENTIFIERS

RELATED AND CO-PENDING APPLICATIONS

This application claims priority to U.S. provisional application entitled "Communication Amongst Entities by way of Public Identifiers", Ser. No. 62/128,333 filed 4 Mar. 2015, the entirety of which is hereby incorporated herein by reference.

BACKGROUND

The present disclosure is in the area of telecommunications in general but more specifically is a means by which users of telecommunication systems are able to communicate with a (perhaps unknown) user (e.g., a person or an entity), directly and privately, without having to know that user's private identifier but instead are able to communicate with that user by way of a public identifier such as a home address, a car license plate, a seat number in a theater, etc.

As used herein, a public identifier is an identifying label that may be of a permanent or temporary nature, may be exposed to the general view and/or is readily accessible to or shared with members of the community.

Certain prior art systems and methods allow for electronic communications between two entities, such as a Usenet group, a bulletin board system (BBS), an internet chat, etc. However, each of these systems/methods are of the web posting/blog variety where information is posted and anyone that accesses a given post/blog can read and reply to the information. Contrarily, in embodiments of the current disclosure information may be sent to a targeted user(s) and so there is no public posting of information that can be seen by others.

Currently, communication between entities relies on the sending entity having knowledge of the intended receiver's individual (private) identifier—which is typically not widely known or publicly available. For example, when placing a phone call, the calling entity identifies the intended receiver by dialing the unique phone number of that intended receiver. Likewise, when emailing, the transmitting entity identifies the intended receiver by the unique email address of the intended receiver; and when friend requesting someone on Facebook, one needs to know the user ID of the person one wishes to friend. In these examples, the unique (private) IDs of the intended receiver must be known by the transmitter a priori in order for the transmitter to communicate with the intended recipient.

Similarly, to communicate via all types of modern communication systems (e.g. cell phones, email, and social media) one must know the unique ID of the targeted receiver before being able to directly contact them. However, users of modern communication systems tend to keep their unique IDs private—disclosing them only to those they know and keeping them hidden from others. Further, the more popular social media applications (e.g., Facebook and Twitter) support only a single user ID per account—they do not support mapping or aliasing more than one ID to a single account.

Thus, current systems and methods for direct and exclusive electronic communication between two entities require that the transmitting entity be previously aware of a private electronic identifier for the receiving entity, such as, for example, an e-mail address for the receiving entity. Thus, for example, if a first person sees a second person in a car and wishes to electronically communicate with the second person but does not know the second person's e-mail address, the first person cannot send an email to the second person.

Accordingly, there is a need for systems and methods that allow for electronic communication between entities where the private identifier of the receiving entity is not known to the transmitting entity.

DETAILED DESCRIPTION

Figure 1:
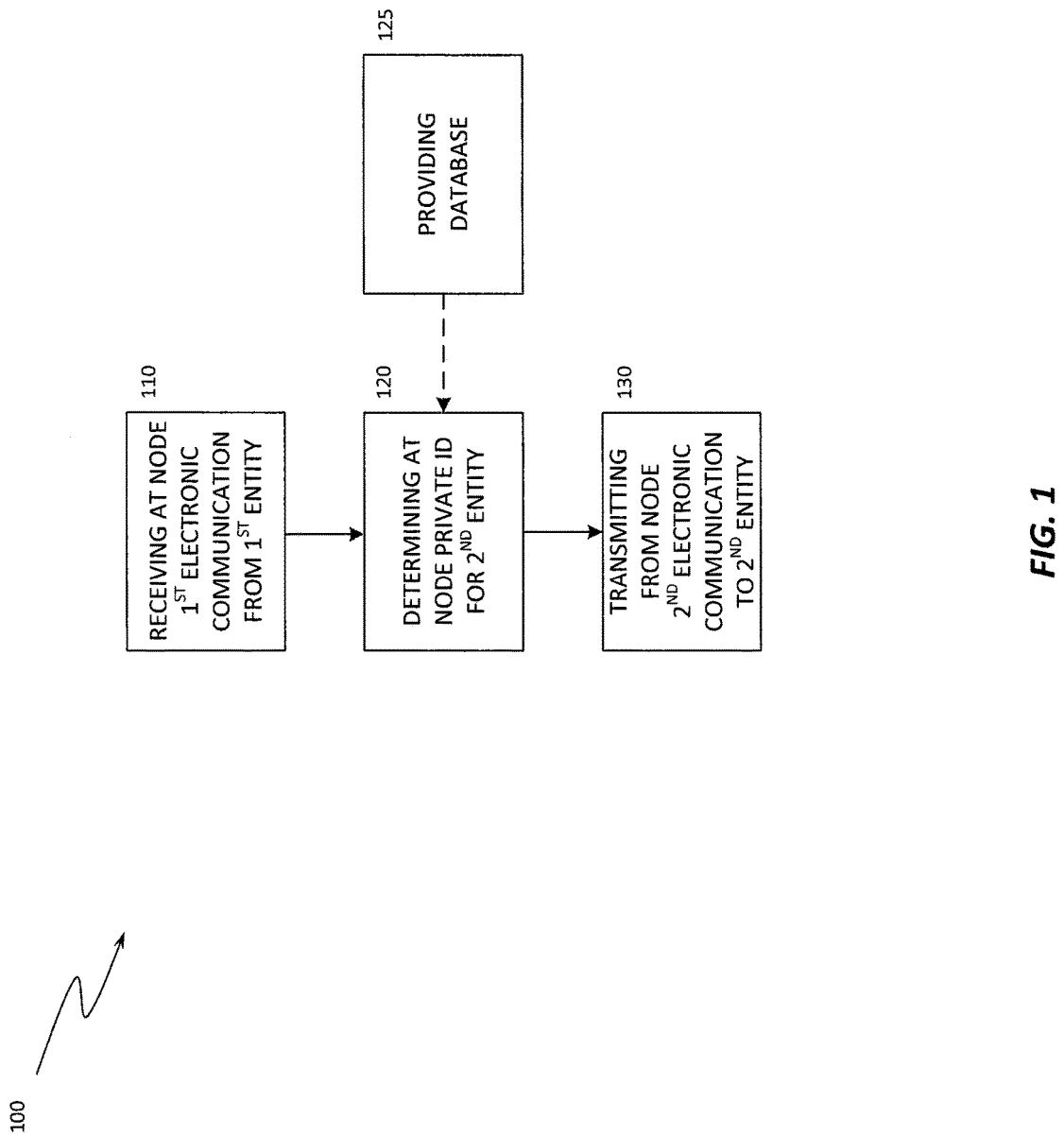
FIG. 1 is a flow chart representing a method for communicating in an electronic communication system using a public identifier according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods for remote measurement and process control solutions, it is to be understood that the discussion is not intended to limit the scope of the present subject matter in any way and that the principles presented are equally applicable to other systems and/or methods for remote measurement and process control solutions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for facilitating communication in a communication network amongst entities by way of publicly-available identifiers are described.

The disclosure recognizes the increasing desire—and often need—to communicate with persons and/or entities with which one does not yet know their private IDs but may have access to some publicly available information about such a person or entity. Embodiments of this disclosure leverage that publicly available information to allow communication between such persons and/or entities.

In certain embodiments, a first user must register his/her public identifiers with a central server so that when a second user tries to contact the first user with the first user's registered public identifier, the second user's message can be routed to the first user.

Embodiments of the disclosure recognize the increasing desire—and often need—to communicate with persons and/or entities with which one does not yet know their private IDs but may have access to some publicly available information about such a person or entity. Embodiments described herein leverage that publicly available information to allow communication between such persons and/or entities. As such, embodiments described herein are an extension to the use of private identifiers as the communication ID to allow the use of publically available identifiers as a communication identifier to address messages and enable communication between entities. In order to accomplish this goal, a mapping needs to take place between public ID(s) and private ID(s). This mapping can take place anywhere in the communication network, including any entity or device within or associated with the communication network itself.

Accordingly, systems and methods disclosed herein facilitate communication in a communication network amongst entities by way of publicly-available identifiers. In an embodiment a first entity sends to a node in the communication network a first electronic communication which includes a public or private identifier for the first entity and a public identifier for a second entity which is a publicly-available identifier observable by the first entity and may include, for example, a vehicle identifier, a geographic locator, a venue identifier, a seating locator, a wearable identification device, and combinations thereof. The node determines a private identifier for the second entity based on the received public identifier for the second entity and sends a second electronic communication to the second entity which includes at least one of the public or private identifier for the first entity and at least one of the public or private identifier for the second entity With attention drawn to FIG. 1, a flow chart 100 is presented representing a method for communicating in an electronic communication system using a public identifier according to an embodiment of the present subject matter.

At block 110, a first electronic communication from a first entity is received at a node in an electronic communication system. The first electronic communication includes at least one of a public or private identifier for the first entity, a public identifier for a second entity, and a first digital content (e.g., an electronic message from the first entity to the second entity). At block 120, a private identifier for the second entity is determined at the node. The private identifier for the second entity is based on the public identifier for the second entity received from the first entity. In other embodiments, the private identifier may be determined at a location other than the node. For example, the private identifier may be determined at the first and/or second entity or at a location in the electronic communication network other than the node. At block 130, a second electronic communication occurs which is transmitted from the node to the second entity. The second electronic communication includes at least one of the public or private identifier for the first entity that was contained in the first electronic communication, at least one of the public or private identifier for the second entity, and the first digital content.

The private identifier for at least one of the first or second entity may be, for example, an e-mail address, a cell phone number, a user identifier for a second electronic communication system, or combinations thereof. Other private identifiers that are known to those of skill in the art are also contemplated herein.

The public identifier for at least one of the first or second entity may be, but is not limited to, a vehicle identifier, a geographic locator, a seating locater, a wearable identification device, a venue identifier, an identification device for a pet, or combinations thereof. Non-limiting examples of a vehicle identifier include a license plate number for a motor vehicle or non-motor vehicle, or a bus, train, plane, or boat identification number, or combinations thereof. Non-limiting examples of a geographic locator include a street address, a zip code, a street name, a town name, a county name, a building name, or a post office box number, or combinations thereof. Non-limiting examples of a seating locater include a desk, table, room, section, row, or seat number, an office number, a locker number, a flight number, or combinations thereof. Non-limiting examples of a venue identifier include a school name, a store name, a mall name, a restaurant name, a stadium name, a theater name, a hospital name, a hotel name, a building name, a parking lot identifier, or combinations thereof.

The first digital content may be any type of electronic content such as, but not limited to, text, picture, audio, or video content, and combinations thereof.

In an embodiment, the public identifier for the second entity includes a first public identifier for the second entity for a first time duration and a second public identifier for the second entity for a second time duration. For example, the first entity may associated the second entity with a license plate number at one time and a school name at another time. In a further embodiment, at least a part of the first time duration occurs prior to a time associated with the receipt of the first electronic communication from the first entity. In a still further embodiment, the first time duration and the second time duration overlap in time.

In other embodiments, the public identifier for the first entity is associated with at least one of a time stamp and a time span. In a further embodiment, determining the private identifier for the second entity is based at least in part on the time stamp associated with the public identifier for the first entity. In another embodiment, the public identifier for the second entity is associated with at least one of a time stamp and a time span. And in a further embodiment, determining the private identifier for the second entity is based at least in part on the time stamp associated with the public identifier for the second entity.

With attention again focused on FIG. 1, in an embodiment, the method for communicating in an electronic communication system using a public identifier includes providing a database including first data associating the public identifier for the second entity with a first private identifier for the second entity for a first time span. In a further embodiment, the database also includes second data associating a second public identifier for the second entity with the private identifier for the second entity for a second time span. In a still further embodiment, the database also includes third data associating a first public identifier for the first entity with the private identifier for the first entity for a third time span. And in yet still a further embodiment, the database also includes fourth data associating a second public identifier for the first entity with the private identifier for the first entity for a fourth time span.

Figure 2:
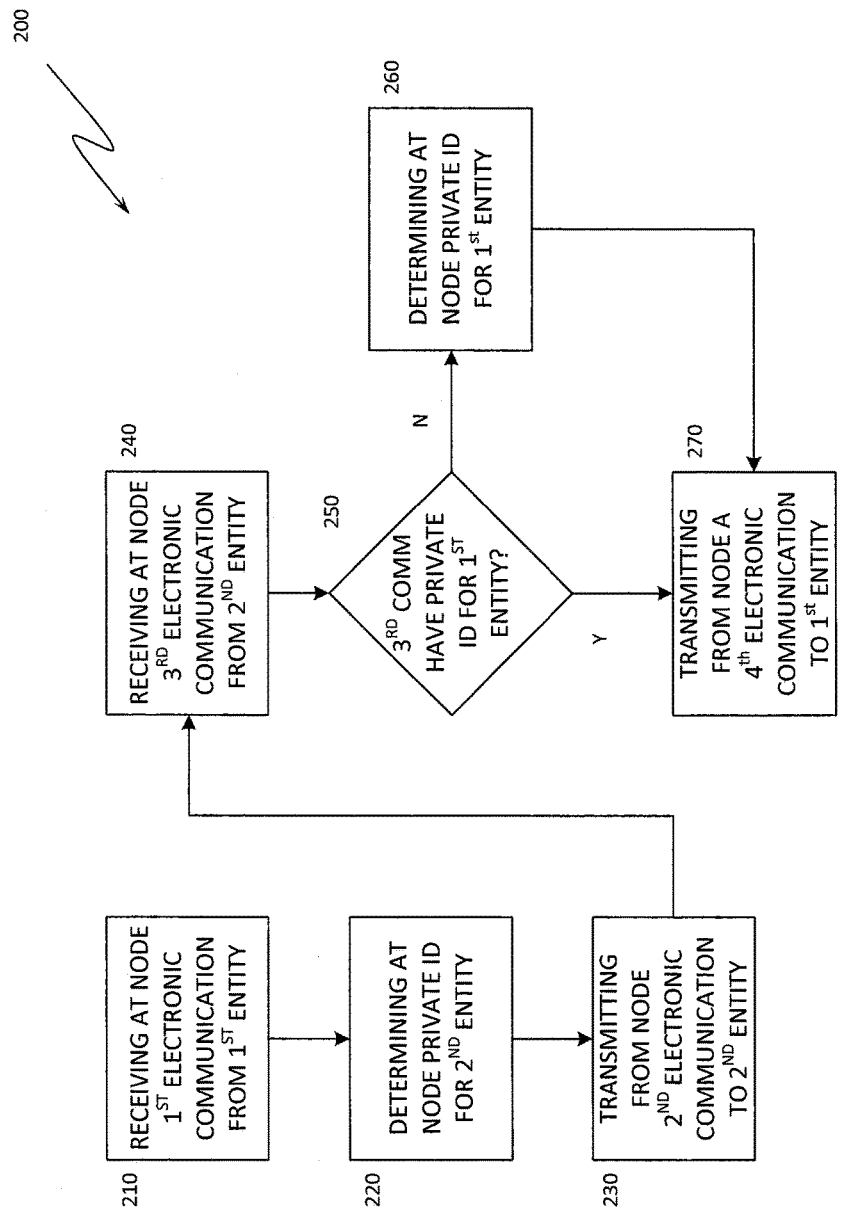
FIG. 2 is a flow chart representing another method for communicating in an electronic communication system using a public identifier according to an embodiment of the present subject matter.

Now turning to FIG. 2, a flow chart 200 is presented representing another method for communicating in an electronic communication system using a public identifier according to an embodiment of the present subject matter.

Blocks 210, 220, and 230 correspond to blocks 110, 120, and 130, respectively, in FIG. 1. At block 240, a third electronic communication from the second entity is received at the node. In an embodiment the third electronic communication includes at least one of the public or private identifier for the first entity contained in the second electronic communication, at least one of the public or private identifier for the second entity, and a second digital content. At block 250, a determination is made at the node as to whether the third electronic communication contains the private identifier for the first entity. In other embodiments, the private identifier may be determined at a location other than the node. For example, the private identifier may be determined at the first and/or second entity or at a location in the electronic communication network other than the node. If the third electronic communication does contain the private identifier for the first entity, then at block 270 a fourth electronic communication is transmitted from the node to the first entity. If the third electronic communication does not contain the private identifier for the first entity, then at block 260 the private identifier for the first entity is determined at the node based on the received public identifier for the first entity in the third electronic communication. Then at block 270 a fourth electronic communication is transmitted from the node to the first entity. In a further embodiment, the fourth electronic communication includes at least one of the public or private identifier for the first entity, at least one of the public or private identifier for the second entity, and the second digital content.

In other embodiments, the second entity includes a plurality of sub-entities. As a non-limiting example, the second entity may be a group of students in a classroom and the sub-entities represent individual students in the group. The first entity may only be aware of the public identity of the second entity and not aware of the public or private identities for any of the sub-entities. In this, and similar, scenarios, the flow chart 200 may encompass the following steps (where, as above, blocks 210, 220, and 230 correspond to blocks 110, 120, and 130, respectively, in FIG. 1). At block 240, a third electronic communication from a first sub-entity of the second entity is received at the node. In an embodiment the third electronic communication includes at least one of the public or private identifier for the first entity contained in the second electronic communication, at least one of the public identifier for the second entity or the private identifier for the first sub-entity of the second entity, and a second digital content.

At block 250, a determination is made at the node as to whether the third electronic communication contains the private identifier for the first entity. In other embodiments, the private identifier may be determined at a location other than the node. For example, the private identifier may be determined at the first and/or second entity or at a location in the electronic communication network other than the node. If the third electronic communication does contain the private identifier for the first entity, then at block 270 a fourth electronic communication is transmitted from the node to the first entity. If the third electronic communication does not contain the private identifier for the first entity, then at block 260 the private identifier for the first entity is determined at the node based on the received public identifier for the first entity in the third electronic communication. Then at block 270 a fourth electronic communication is transmitted from the node to the first entity. In a further embodiment, the fourth electronic communication includes at least one of the public or private identifier for the first entity, at least one of the public identifier for the second entity or the private identifier for the first sub-entity of the second entity, and the second digital content.

Figure 3:
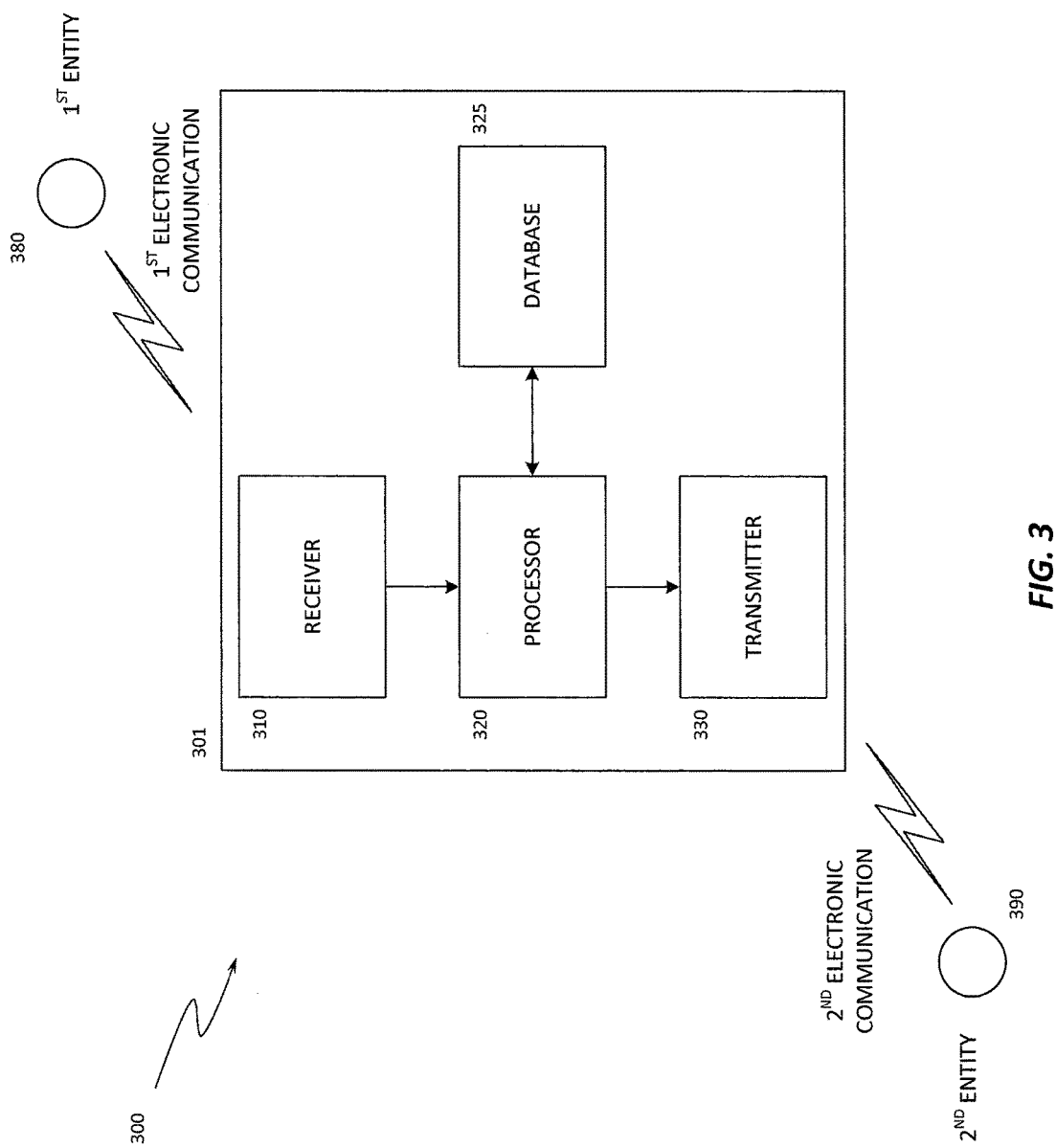
FIG. 3 is a block diagram representing an electronic communication system for communicating using a public identifier according to an embodiment of the present subject matter.

FIG. 3 illustrates a block diagram 300 representing an electronic communication system for communicating using a public identifier according to an embodiment of the present subject matter. Node 301 is a node in an electronic communication system. In the particular embodiment shown, node 301 includes receiver 310 which is operatively coupled to processor 320 which is operatively coupled to transmitter 330. Database 325 is operatively coupled to processor 320. Also included in FIG. 3 are first entity 380 and second entity 390, as described above.

In an embodiment, receiver 310 receives a first electronic communication from first entity 380, such as a wireless communication. The first electronic communication may include at least one of a public or private identifier for the first entity, a public identifier for a second entity, and a first digital content (e.g., an electronic message from the first entity to the second entity), as described above. Processor 320 receives all or some of the information in the first electronic communication from receiver 310 and determines, in conjunction with the database 325, a private identifier for the second entity based on the public identifier for the second entity received from the first entity. In an embodiment, the database 325 includes first data associating the public identifier for the second entity with one or more private identifiers for the second entity. Some or all of the associations between the public and private identifiers for a particular entity may be valid only for a given time span, e.g., a first public identifier for the second entity may only be associated with a private identifier for the second entity for a first time span while a second public identifier for the second entity may only be associated with the same private identifier (or a different private identifier) for the second entity for a second time span. In an embodiment, the first and second time spans may overlap. Similarly, in a still further embodiment, the database 325 also includes third data associating a first public identifier for the first entity with the private identifier for the first entity for a third time span, and in yet still a further embodiment, the database 325 also includes fourth data associating a second public identifier for the first entity with the private identifier for the first entity for a fourth time span.

Once the private identifier for the second entity is determined, the private identifier for the second entity along with information in the first electronic communication, such as, but not limited to, the public or private identifier for the first entity and the first digital content, is sent to the transmitter 330. The transmitter 330 sends a second electronic communication to the second entity 390. The second electronic communication includes at least one of the public or private identifier for the first entity that was contained in the first electronic communication, at least one of the public or private identifier for the second entity, and the first digital content.

In other embodiments, the private identifier(s) may be determined at a location other than the node. For example, the private identifier(s) may be determined at the first and/or second entity or at a location in the electronic communication network other than the node.

Figure 4:
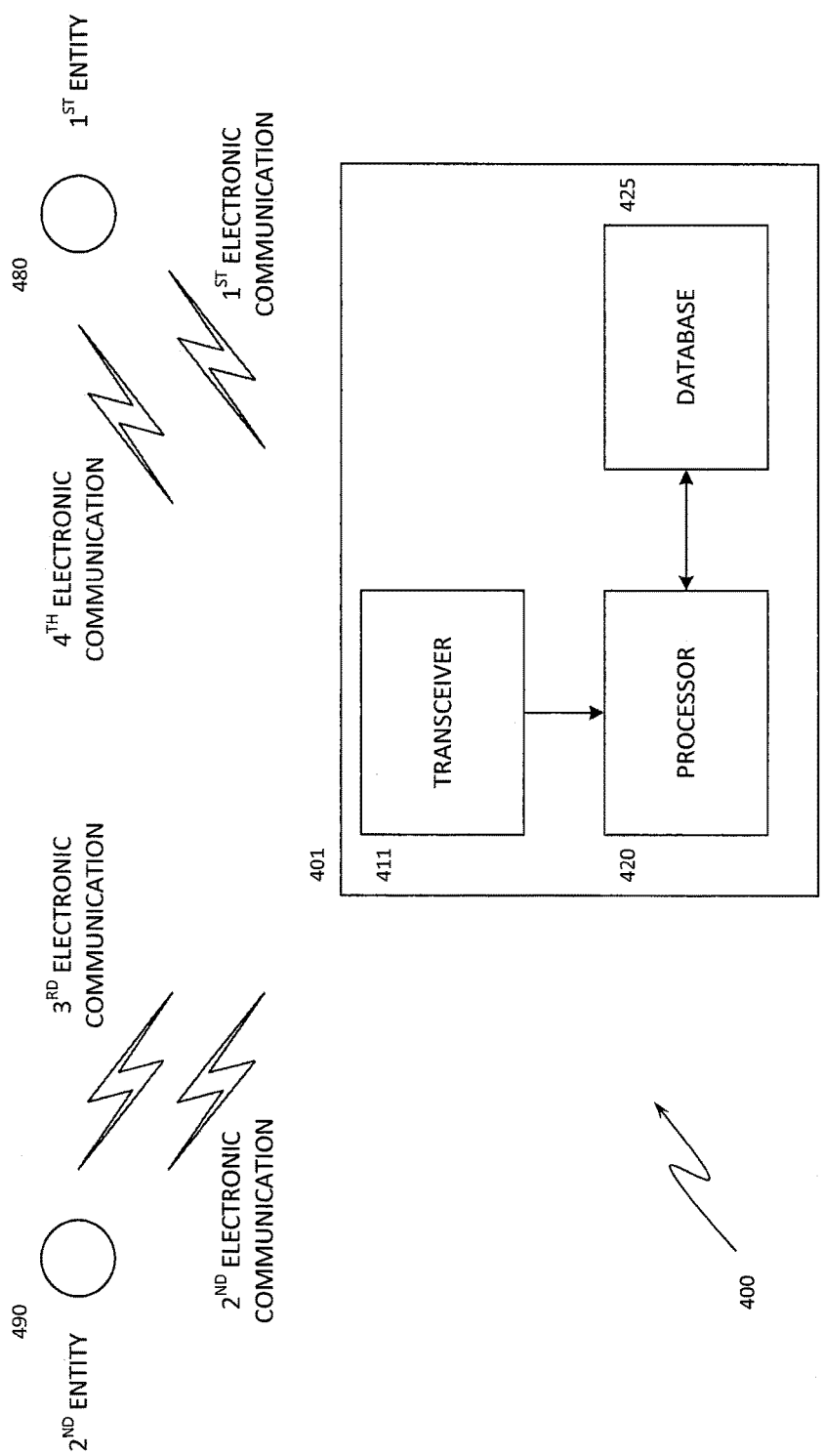
FIG. 4 is a block diagram representing another electronic communication system for communicating using a public identifier according to an embodiment of the present subject matter.

Considering FIG. 4, a block diagram 400 is presented which represents another electronic communication system for communicating using a public identifier according to an embodiment of the present subject matter. In FIG. 4, node 401, which is a node in an electronic communication system, includes transceiver 411 which is operatively coupled to processor 420 which is operatively coupled to database 425. Also included in FIG. 4 are first entity 480 and second entity 490. Processor 420 and database 425 correspond to processor 320 and database 325, respectively, as described above with respect to FIG. 3. First entity 480 and second entity 490 correspond to first entity 380 and second entity 390, respectively, as described above with respect to FIG. 3.

In an embodiment, the electronic communication system operates as follows. The transceiver 411 of node 401 receives a first electronic communication from the first entity 480. In an embodiment, the first electronic communication includes at least one of a public or private identifier for the first entity, a public identifier for the second entity, and a first digital content. Processor 420 receives all or some of the information in the first electronic communication from transceiver 411 and determines, in conjunction with the database 425, a private identifier for the second entity based on the public identifier for the second entity received from the first entity.

Once the private identifier for the second entity is determined, the private identifier for the second entity along with information in the first electronic communication, such as, but not limited to, the public or private identifier for the first entity and the first digital content, is sent to transceiver 411. Transceiver 411 sends a second electronic communication to the second entity 490. The second electronic communication includes at least one of the public or private identifier for the first entity that was contained in the first electronic communication, at least one of the public or private identifier for the second entity, and the first digital content.

In a further embodiment, the transceiver 411 receives a third electronic communication from the second entity. In an embodiment, the third electronic communication includes at least one of the public or private identifier for the first entity contained in the second electronic communication, at least one of the public or private identifier for the second entity, and a second digital content. Processor 420 receives all or some of the information in the third electronic communication from transceiver 411 and determines, in conjunction with the database 425, a private identifier for the first entity based on the public identifier for the first entity in the third electronic communication.

Once the private identifier for the first entity is determined, the private identifier for the first entity along with information in the third electronic communication, such as, but not limited to, the public or private identifier for the second entity and the second digital content, is sent to transceiver 411. Transceiver 411 sends a fourth electronic communication to the first entity 480. The fourth electronic communication includes at least one of the public or private identifier for the first entity, at least one of the public or private identifier for the second entity, and the second digital content.

In other embodiments, the private identifier(s) may be determined at a location other than the node. For example, the private identifier(s) may be determined at the first and/or second entity or at a location in the electronic communication network other than the node.

The following are non-limiting examples of the use of the above-disclosed embodiments utilizing the concept of mapping one or more publicly-available IDs to one or more users' private ID.

As a first non-limiting example, a first passenger in a first car is driving on a freeway and spots a safety concern with a second car and wishes to alert the driver of the second car of the potential hazard. With the current state-of-the-art electronic communication devices and/or protocols, the first passenger in the first car would have to employ a time-consuming and/or potentially dangerous means of communicating the hazard to the second driver, e.g., by trying to contact the local authorities and convince them to dispatch a police car to try and catch the second car before the hazard materializes. However, even if the first passenger in the first car did convince the local authorities to dispatch a car to chase down the second car, this process may take too long (and would also incur a cost to the local authorities). Alternatively, the first driver may try to drive close enough to the second car in an attempt to 'flag' down the second driver so that the first passenger in the first car could convey a message to the second driver. However not all drivers would respond well to being 'flagged-down' for fear of harassment; and further, this method may also be dangerous to both motorists. However, if the first passenger in the first car is able to read the publicly visible license plate of the second car, the first passenger in the first car, utilizing an embodiment of the electronic communication method/system as disclosed herein, may be able to directly and safely communicate with the second driver (or another person in the second car) by using the publicly-available license plate of the second car as the public ID.

As a second non-limiting example, a first person is on a road trip with his/her family far from home and the kids spot a second car with a license plate from the same state as themselves and are curious about what town the people in the second car are from, where the second car is headed, if they may even know the people in the second car, etc. With the available state-of-the-art communication systems, there would be no means of safely and effectively addressing these questions with the occupants of the second car while both cars are moving. However, someone in the first car may read the publicly visible license plate of the second car, use the license plate number of the second car as the public ID for the second car, and utilize an embodiment of the electronic communication method/system as disclosed herein to directly and safely communicate with someone in the second car.

As a third non-limiting example, a first person likes some of the amenities of a house he/she is passing, e.g., landscaping, house color, or Christmas decorations. The first person does not know the residents in the house, so with today's current state-of-the-art communication systems, the first person would have to resort to a somewhat primitive means of communication to convey a message, e.g., stop and knock on the door, possibly scaring or disturbing the residents, or take the time to manually write and leave a note. However, using an embodiment of the electronic communication method/system as disclosed herein, the first person may read the publicly visible address of the house in question and directly and safely communicate with the residents in the house by using their publicly-available street address as the public ID.

By extension, as a fourth non-limiting example, if the first person wants to convey a message to an entire street, or town, or county, etc., the first person could use the corresponding equivalent public identifier, e.g., street name, town name, zip code, county name, etc., as the publicly-available communication ID to directly and safely communicate a message to the second party (e.g., the people located in the street, or town, or county). This example utilizes a disclosed embodiment to broadcast a message to a target group.

As a fifth non-limiting example, a first person may be in a theater or on a plane, bus, or train, and want to communicate with a second person located some seats away from the first person. Since the first person does not know the second person, with today's current state-of-the-art, the first person would have to physically approach the second person to communicate a message to them. This may alarm the second person and/or be distracting to others. However, by utilizing an embodiment of the present disclosure, the first person is able to determine the seat number of the second person, and, using that seat number as a publicly-available ID for the second person directly and discretely communicate with the second person.

As a sixth non-limiting example, if a first person wishes to convey a message to an entire row or theater or plane, bus, or train, (e.g., broadcast to a target group) the first person could use the corresponding equivalent publicly-available identifier e.g. row ID, theater ID, plane ID, bus ID, or train ID to directly and discretely communicate the message.

As a seventh non-limiting example, if a first person wants to mail an advertisement and receive communications from residents of a certain street or town or county, etc., using current technology the first person must first print the ads to be mailed, address them as necessary, and then mail them via the post-office to all intended recipients. Then the first person must wait to receive return mailings. This system is both costly and time-consuming. However, by utilizing an embodiment of the present disclosure, the first person could send (e.g., email) the advertisement in digital form to all residents of the town using a corresponding publicly-available ID (e.g., street name, town name, zip code, or county name) as the public ID for the target audience.

As an eighth non-limiting example, if a first person bought a ticket for a concert and wanted to contact the people that would be sitting next to them in advance of first meeting them at the concert, with the current state of the art the first person would have no way to directly contact those people prior to meeting them at the concert. However, using an embodiment of the present disclosure the first person could send an electronic message to the people he/she wanted to contact by using the concert venue and seat IDs (e.g., row and seat number) of the seats next to him/her as the public IDs and by attaching a time stamp of the (future) date and time of the concert. Thus, he/she could contact the people that would be in the neighboring seats during the concert being held at that venue on that future day/time.

As a ninth non-limiting example, if a first person wanted to contact people he/she had been sitting next to at a concert but had not obtained the private contact information of those people during the concert, with the current state of the art the first person would have no way to directly contact those people after leaving the concert. However, using an embodiment of the present disclosure the first person could send an electronic message to the people that had been sitting next to him/her during the concert, using the concert venue and seat IDs (e.g., row and seat number) of the seats next to him/her as the public IDs and by attaching a time stamp of the (already past) date and time of the concert. Thus, he/she would be able to contact the people that were in the neighboring seats during the concert that had been held at that venue on that past day/time.

Certain embodiments of the present disclosure may be implemented by a computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant, a mobile audio or video player, a game console, to name just a few.

Computer readable media suitable for storing computer program instructions and data include all forms of data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for communicating in an electronic communication system, comprising the steps of:
   (a) receiving, at a node in an electronic communication system, a first electronic communication from a first entity, wherein the first electronic communication includes:
      (i) at least one of a public or private identifier for the first entity;
      (ii) a public identifier for a second entity; and
      (iii) a first digital content;
      wherein the public identifier for the first entity and the public identifier for the second entity are each selected from the group of identifiers consisting of: a vehicle identifier, a geographic locator, a seating locator, a wearable identification device, a venue identifier, an identification device for a pet, and combinations thereof;
   (b) determining, at said node, a private identifier for the second entity based on the received public identifier for the second entity using a database that includes first data associating, for a predetermined first time span, the received public identifier for the second entity with the private identifier for the second entity; and
   (c) transmitting, from said node, a second electronic communication to the second entity, wherein the second electronic communication includes:
      (i) at least one of the public or private identifier for the first entity contained in the first electronic communication;
      (ii) at least one of the received public identifier or the private identifier for the second entity; and
      (iii) the first digital content.

2. The method of claim 1 further comprising the step of:
   (d) receiving, at said node, a third electronic communication from the second entity, wherein the third electronic communication includes:
      (i) at least one of the public or private identifier for the first entity contained in the second electronic communication;
      (ii) at least one of the received public identifier or the private identifier for the second entity; and
      (iii) a second digital content.

3. The method of claim 2 further comprising the step of:
   (e) for the condition where the third electronic communication does not contain the private identifier for the first entity, determining, at said node, the private identifier for the first entity based on the received public identifier for the first entity in the third electronic communication.

4. The method of claim 3 further comprising the step of:
   (f) transmitting a fourth electronic communication to the first entity, wherein the fourth electronic communication includes:
      (i) at least one of the public or private identifier for the first entity;
      (ii) at least one of the received public identifier or the private identifier for the second entity; and
      (iv) the second digital content.

5. The method of claim 2 further comprising the step of:
   (e) transmitting a fourth electronic communication to the first entity, wherein the fourth electronic communication includes:
      (i) at least one of the public or private identifier for the first entity;
      (ii) at least one of the received public identifier or the private identifier for the second entity; and
      (iv) the second digital content.

6. The method of claim 1 wherein the private identifier for at least one of the first or second entity is selected from the group consisting of: an e-mail address, a cell phone number, and a user identifier for a second electronic communication system.

7. The method of claim 1 wherein:
(a) the vehicle identifier includes at least one of a license plate number for a motor vehicle or non-motor vehicle, or a bus, train, plane, or boat identification number;
(b) the geographic locator includes at least one of a street address, a zip code, a street name, a town name, a county name, a building name, or a post office box number;
(c) the seating locater includes at least one of a desk, table, room, section, row, or seat number, an office number, a locker number, or a flight number; and
(d) the venue identifier includes at least one of a school name, a store name, a mall name, a restaurant name, a stadium name, a theater name, a hospital name, a hotel name, a building name, or a parking lot identifier.

8. The method of claim 1 wherein the first digital content is selected from the group consisting of: text, picture, audio, video, and combinations thereof.

9. The method of claim 1 wherein the received public identifier for the second entity includes a first public identifier for a first time duration and a second public identifier for a second time duration.

10. The method of claim 9 wherein the first time duration and the second time duration overlap in time.

11. The method of claim 9 wherein at least a part of the first time duration occurs prior to a time associated with the receipt of the first electronic communication from the first entity.

12. The method of claim 1 wherein the public identifier for the first entity is associated with at least one of a time stamp and a time span.

13. The method of claim 12 wherein the step of determining the private identifier for the second entity is based at least in part on the time stamp.

14. The method of claim 1 wherein the received public identifier for the second entity is associated with at least one of a time stamp and a time span.

15. The method of claim 14 wherein the step of determining the private identifier for the second entity is based at least in part on the time stamp.

16. The method of claim 1 wherein the database further includes:
second data associating a second public identifier for the second entity with the private identifier for the second entity for a second time span.

17. The method of claim 16 further comprising:
third data associating a first public identifier for the first entity with the private identifier for the first entity for a third time span.

18. The method of claim 17 further comprising:
fourth data associating a second public identifier for the first entity with the private identifier for the first entity for a fourth time span.

19. The method of claim 1 wherein the second entity includes a plurality of sub-entities.

20. The method of claim 19 further comprising the steps of:
(d) receiving, at said node, a third electronic communication from a first sub-entity of the plurality of sub-entities, wherein the third electronic communication includes:
(i) at least one of the public or private identifier for the first entity contained in the second electronic communication;
(ii) at least one of the received public identifier for the second entity or the private identifier for the first sub-entity; and
(iii) a second digital content;
(e) for the condition where the third electronic communication does not contain the private identifier for the first entity, determining, at said node, the private identifier for the first entity based on the received public identifier for the first entity in the third electronic communication; and
(f) transmitting a fourth electronic communication to the first entity, wherein the fourth electronic communication includes:
(i) at least one of the public or private identifier for the first entity;
(ii) at least one of the received public identifier for the second entity or the private identifier for the first sub-entity; and
(iv) the second digital content.

21. The method of claim 1 wherein the private identifier for the second entity includes a first private identifier for the second entity and a second private identifier for the second entity.

22. The method of claim 21 wherein at least one of the first and second private identifiers for the second entity is selected from the group consisting of: an e-mail address, a cell phone number, and a user identifier for a second electronic communication system.

23. A system for electronic communication, comprising:
a transceiver for receiving, at a node in an electronic communication system, a first electronic communication from a first entity, wherein the first electronic communication includes:
(i) at least one of a public or private identifier for the first entity;
(ii) a public identifier for a second entity; and
(iii) a first digital content;
wherein the public identifier for the first entity and the public identifier for the second entity are each selected from the group of identifiers consisting of: a vehicle identifier, a geographic locator, a seating locater, a wearable identification device, a venue identifier, an identification device for a pet, and combinations thereof;
a processor operatively connected to said transceiver and to a database, wherein said processor and said database determine, for a predetermined first time span, a private identifier for the second entity based on the received public identifier for the second entity; and
said transceiver for transmitting, from said node, a second electronic communication to the second entity, wherein the second electronic communication includes:
(iv) at least one of the public or private identifier for the first entity contained in the first electronic communication;
(v) at least one of the received public identifier or the private identifier for the second entity;
(vi) the first digital content.

24. The system of claim 23 wherein said transceiver further receives a third electronic communication from the second entity, wherein the third electronic communication includes:
(vii) at least one of the public or private identifier for the first entity contained in the second electronic communication;

(viii) at least one of the received public identifier or the private identifier for the second entity; and
(ix) a second digital content;
and
wherein for the condition where the third electronic communication does not contain the private identifier for the first entity, determining, using said processor and said database, the private identifier for the first entity based on the received public identifier for the first entity in the third electronic communication; and
wherein said transceiver transmits a fourth electronic communication to the first entity, wherein the fourth electronic communication includes:
(x) at least one of the public or private identifier for the first entity;
(xi) at least one of the received public identifier or the private identifier for the second entity; and
(xii) the second digital content.

25. The system of claim 23 wherein the private identifier for the second entity includes a first private identifier for the second entity and a second private identifier for the second entity.

26. The system of claim 25 wherein at least one of the first and second private identifiers for the second entity is selected from the group consisting of: an e-mail address, a cell phone number, and a user identifier for a second electronic communication system.

* * * * *